United States Patent
Takemori et al.

(10) Patent No.: US 10,673,621 B2
(45) Date of Patent: Jun. 2, 2020

(54) MANAGEMENT DEVICE, VEHICLE, MANAGEMENT METHOD, AND COMPUTER PROGRAM

(71) Applicant: KDDI CORPORATION, Tokyo (JP)

(72) Inventors: Keisuke Takemori, Tokyo (JP); Hideaki Kawabata, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 219 days.

(21) Appl. No.: 15/559,944

(22) PCT Filed: Mar. 10, 2016

(86) PCT No.: PCT/JP2016/057573
§ 371 (c)(1),
(2) Date: Sep. 20, 2017

(87) PCT Pub. No.: WO2016/152556
PCT Pub. Date: Sep. 29, 2016

(65) Prior Publication Data
US 2018/0068107 A1 Mar. 8, 2018

(30) Foreign Application Priority Data
Mar. 26, 2015 (JP) .................................. 2015-063680

(51) Int. Cl.
*H04L 9/08* (2006.01)
*H04L 9/16* (2006.01)
(Continued)

(52) U.S. Cl.
CPC ............... *H04L 9/08* (2013.01); *G06F 21/44* (2013.01); *H04L 9/0822* (2013.01);
(Continued)

(58) Field of Classification Search
CPC ....................................................... H04L 9/08
See application file for complete search history.

(56) References Cited

U.S. PATENT DOCUMENTS 4,754,255 A * 6/1988 Sanders ............. G07C 9/00182
  307/10.4
6,259,168 B1 * 7/2001 Okada ..................... B60R 25/04
  123/198 DB
(Continued)

FOREIGN PATENT DOCUMENTS

CN   101939947 A   1/2011
CN   101983504 A   3/2011
(Continued)

OTHER PUBLICATIONS

Japanese Office Action issued for Japanese Patent Application No. 2017-239086 dated Aug. 7, 2018 along with English translation thereof.
(Continued)

*Primary Examiner* — Bradley W Holder
(74) *Attorney, Agent, or Firm* — Greenblum & Bernstein, P.L.C.

(57) ABSTRACT

A management device installed in an automobile includes an initially-delivered key storage unit for storing a plurality of initially-delivered keys corresponding to candidates of initially-delivered keys held by an ECU, a communication part for communicating with the ECU, a verification part for verifying encrypted data from the ECU with the initially-delivered key of the initially-delivered key storage unit, and a wireless communication part for receiving a new initially-delivered key held by a new ECU newly installed in the automobile from management server equipment through a wireless communication network. The initially-delivered key storage unit stores the new initially-delivered key received with the wireless communication part.

13 Claims, 10 Drawing Sheets

(51) Int. Cl.
*H04L 9/32* (2006.01)
*G06F 21/44* (2013.01)

(52) U.S. Cl.
CPC .............. *H04L 9/0891* (2013.01); *H04L 9/16* (2013.01); *H04L 9/32* (2013.01); *H04L 9/3271* (2013.01); *H04L 2209/84* (2013.01)

(56) References Cited

U.S. PATENT DOCUMENTS

| | | | |
|---|---|---|---|
| 8,396,943 B2 | 3/2013 | Okaya et al. | |
| 9,045,095 B2* | 6/2015 | Sella | B60R 16/023 |
| 9,641,329 B2* | 5/2017 | Takahashi | H04L 9/0894 |
| 2004/0003231 A1 | 1/2004 | Levenson et al. | |
| 2006/0255910 A1 | 11/2006 | Fukushima et al. | |
| 2008/0288135 A1* | 11/2008 | Katrak | H04L 9/3297 701/31.4 |
| 2011/0010435 A1 | 1/2011 | Okaya et al. | |
| 2014/0114497 A1* | 4/2014 | Miyake | H04L 9/32 701/1 |
| 2014/0354402 A1* | 12/2014 | Joao | G07C 9/00896 340/5.52 |
| 2015/0033019 A1 | 1/2015 | Oguma et al. | |
| 2015/0095997 A1 | 4/2015 | Mabuchi | |
| 2015/0180840 A1* | 6/2015 | Jung | G06F 8/654 713/150 |
| 2015/0298654 A1* | 10/2015 | Joao | G01S 19/16 701/2 |
| 2016/0315766 A1* | 10/2016 | Ujiie | H04L 63/0428 |
| 2016/0330204 A1* | 11/2016 | Baur | G06F 21/44 |

FOREIGN PATENT DOCUMENTS

| | | |
|---|---|---|
| CN | 102907039 A | 1/2013 |
| JP | 2013-017140 A | 1/2013 |
| JP | 2013-138304 A | 7/2013 |
| JP | 2013-157693 A | 8/2013 |
| JP | 2013-168865 A | 8/2013 |
| JP | 2016-184835 | 10/2016 |
| WO | 2013/179392 A1 | 12/2013 |

OTHER PUBLICATIONS

Extended European search report for European Patent Application No. 16768459.6 dated Oct. 19, 2018.
Valasek et al., "Adventures in Automotive Networks and Control Units", DEF CON 21, Aug. 2013.
"Trusted Computing Group", http://www.trustedcomputinggroup.org/, printed on Mar. 22, 2017.
Takada et al., "Suggestion for Intensifying Information Security for Vehicle-Embedded System", along with an English translation thereof, http://www.ipa.gov.jp/files/000034668, Sep. 2013.
Takemori et al., "Secure Boot mechanisms for Android(ARM) device using TPM", the Institute of Electronics, Information and Communication Engineers, SCIS2013 Symposium, Jan. 2013.
Takemori, "Secure Boot for Android+TPM", Nikkei Electronics, Aug. 6, 2012, along with a partial English translation thereof.
Takemori et al., "Secure Boot Mechanisms for ARM Device Using SIM/UIM", the Institute of Electronics, along with an English translation, Information and Communication Engineers, SCIS2014 Symposium, Jan. 2014.
Takemori, "In-Vehicle Network Security Using Secure Elements—Discussion of Security Technologies-", the Institute of Electronics, Information and Communication Engineers, vol. 114 No. 508, Mar. 9, 2015, pp. 73-78.
International Search Report (ISR) issued in International Pat. Appl. No. PCT/JP2016/057573, dated May 31, 2016.
Office Action issued in Japanese Patent Appl. No. 2015-063680, dated Jul. 11, 2017, along with an English translation thereof.
Office Action issued in Japanese Patent Appl. No. 2015-063680, dated Apr. 4, 2017, along with an English translation thereof.
Office Action dated Nov. 4, 2019 issued in Chinese Patent Application No. 201680018541.4 and corresponding English translation.

* cited by examiner

MANAGEMENT DEVICE, VEHICLE, MANAGEMENT METHOD, AND COMPUTER PROGRAM

TECHNICAL FIELD

The present invention relates to a management device, a vehicle, a management method, and a computer program.

The present application claims the benefit of priority on Japanese Patent Application No. 2015-63680 filed on Mar. 26, 2015, the subject matter of which is hereby incorporated herein by reference.

BACKGROUND ART

Recently, automobiles equipped with ECUs (Electronic Control Units) have been designed to achieve control functions for engines with ECUs. Herein, ECUs are one type of computer which achieves desired functions according to computer programs. Normally, it is necessary to update computer programs for ECUs installed in already-used automobiles on inspection or periodic inspection of automobiles in conventional automobile repair shops.

Conventionally, an operator involved in updating computer programs for ECUs should connect a diagnosis terminal, exclusively used for automobiles, to a diagnostic port of an automobile, which is called an OBD (On-Board Diagnostics) port, and therefore the operator can install updated programs and change settings of data with the diagnosis terminal. In this connection, for example, Non-Patent Literatures 1, 2 disclose technologies concerning security for ECUs.

CITATION LIST

Non-Patent Literature

Non-Patent Literature 1: C. Millerr, C. Valasek, "Adventures in Automotive Networks and Control Units", DEF CON 21, August 2013

Non-Patent Literature 2: Hiroaki Takada, Tsutomu Matsumoto, "Suggestion for Intensifying Information Security for Vehicle-Embedded System", September 2013, Internet <URL: https://www.ipa.go.jp/files/000034668.pdf>

Non-Patent Literature 3: Trusted Computer Group, Internet <URL: http://www.trustedcomputinggroup.org/>

Non-Patent Literature 4: Keisuke Takemori, "Secure Boot for Android+TPM", Nikkei Electronics, Aug. 6, 2012

Non-Patent Literature 5: Keisuke Takemori, Hideaki Kawabata, Takamasa Isohara, Wataru Kubota, "Secure Boot for Android(ARM)+TPM", the Institute of Electronics, Information and Communication Engineers, SCIS2013 Symposium, January 2013

Non-Patent Literature 6: Keisuke Takemori, Hideaki Kawabata, Wataru Kubota, "Secure Boot for AMU-SIM/UIM", the Institute of Electronics, Information and Communication Engineers, SCIS2014 Symposium, January 2014

SUMMARY OF INVENTION

Technical Problem

The aforementioned technologies of Non-Patent Literatures 1, 2 fail to teach any means for achieving improvement in security. For this reason, it is expected to improve reliability in adaptation of data such as computer programs used for onboard computers such as ECUs installed in vehicles such as automobiles.

For example, it is possible to improve a protective function of an onboard computer by way of mutual authentication for counterpart devices used to exchange data by use of keys held by ECUs after ECUs are activated. Alternatively, for example, it is possible to verify correctness of data exchanged between ECUs by use of keys held by ECUs. In addition, when data such as computer programs used for ECUs having attached electronic signatures are delivered to management devices of automobiles, for example, it is possible to inspect data such as computer programs used for ECUs by verifying electronic signatures attached to the delivered data by use of keys held by management devices. Herein, a problem concerning the security of keys may lead to a method how to manage and update keys held by automobiles.

The present invention is made in consideration of the aforementioned circumstances, and therefore it aims to provide a management device, a vehicle, a management method, and a computer program contributing to management and updating of keys held by vehicles such as automobiles.

Solution to Problem (1) One aspect of the present invention relates to a management device installed in a vehicle. The management device includes an initially-delivered key storage unit configured to store a plurality of initially-delivered keys serving as candidates of initially-delivered keys to be held by an onboard computer installed in the vehicle, a communication part configured to communicate with the onboard computer installed in the vehicle, a verification part configured to receive encrypted data from the onboard computer installed in the vehicle with the communication part so as to verify the encrypted data by use of the initially-delivered key stored on the initially-delivered key storage unit, and a wireless communication part configured to receive a new initially-delivered key held by a new onboard computer newly installed in the vehicle from management server equipment through a wireless communication network. The initially-delivered key storage unit stores the new initially-delivered key received by the wireless communication part.

(2) One aspect of the present invention relates to a management device installed in a vehicle. The management device includes an initially-delivered key storage unit configured to store an initially-delivered key held by an onboard computer installed in the vehicle and a new initially-delivered key held by a new onboard computer newly installed in the vehicle, a communication part configured to communicate with the onboard computer installed in the vehicle, and a verification part configured to receive encrypted data from the onboard computer installed in the vehicle with the communication part so as to verify the encrypted data with the initially-delivered key stored on the initially-delivered key storage unit.

(3) One aspect of the present invention relates to the management device according to (1) or (2). The management device further includes a key generation part configured to generate a key, an encryption processor configured to generate an encrypted key by encrypting the key generated by the key generation part, and a key storage unit configured to store the key generated by the key generation part. The communication part sends the encrypted key to the onboard computer leading to successful verification with the verification part among the onboard computers installed in the vehicle.

(4) One aspect of the present invention relates to a vehicle including the management device according to any one of (1) to (3).

(5) One aspect of the present invention relates to a management method. The management method includes an initially-delivered key storing step for a management device installed in a vehicle to store a plurality of initially-delivered keys serving as candidates of initially-delivered keys to be held by an onboard computer installed in the vehicle on an initially-delivered key storage unit, a communicating step for the management device to communicate with the onboard computer installed in the vehicle, a verifying step for the management device to receive encrypted data from the onboard computer installed in the vehicle in the communicating step so as to verify the encrypted data by use of the initially-delivered key stored on the initially-delivered key storage unit, a wirelessly communicating step for the management device to receive a new initially-delivered key held by a new onboard computer newly installed in the vehicle from management server equipment through a wireless communication network, and a storing step for the initially-delivered key storage unit to store the new initially-delivered key received in the wirelessly communicating step.

(6) One aspect of the present invention relates to a management method. The management method includes an initially-delivered key storing step for a management device installed in a vehicle to store an initially-delivered key held by an onboard computer installed in the vehicle and a new initially-delivered key held by a new onboard computer newly installed in the vehicle on an initially-delivered key storage unit, a communicating step for the management device to communicate with the onboard computer installed in the vehicle, and a verifying step for the management device to receive encrypted data from the onboard computer installed in the vehicle in the communicating step so as to verify the encrypted data with the initially-delivered key stored on the initially-delivered key storage unit.

(7) One aspect of the present invention relates to a computer program. The computer program causes a computer installed in a vehicle to execute an initially-delivered key storing step for storing a plurality of initially-delivered keys serving as candidates of initially-delivered keys to be held by an onboard computer installed in the vehicle on an initially-delivered key storage unit, a communicating step for communicating with the onboard computer installed in the vehicle, a verifying step for receiving encrypted data from the onboard computer installed in the vehicle in the communicating step so as to verify the encrypted data by use of the initially-delivered key stored on the initially-delivered key storage unit, a wirelessly communicating step for receiving a new initially-delivered key held by a new onboard computer newly installed in the vehicle from management server equipment through a wireless communication network, and a storing step for storing the new initially-delivered key received in the wirelessly communicating step on the initially-delivered key storage unit.

(8) One aspect of the present invention relates to a computer program. The computer program causes a computer installed in a vehicle to execute an initially-delivered key storing step for storing an initially-delivered key held by an onboard computer installed in the vehicle and a new initially-delivered key held by a new onboard computer newly installed in the vehicle on an initially-delivered key storage unit, a communicating step for communicating with the onboard computer installed in the vehicle, and a verifying step for receiving encrypted data from the onboard computer installed in the vehicle in the communicating step so as to verify the encrypted data with the initially-delivered key stored on the initially-delivered key storage unit.

Advantageous Effects of Invention

According to the present invention, it is possible to obtain an effect of contributing to management and updating of keys held by vehicles such as automobiles.

DESCRIPTION OF EMBODIMENTS

Hereinafter, various embodiments of the present invention will be described with reference to the drawings. In this connection, the following embodiments are each related to an automobile exemplifying a vehicle.

First Embodiment

Figure 1:
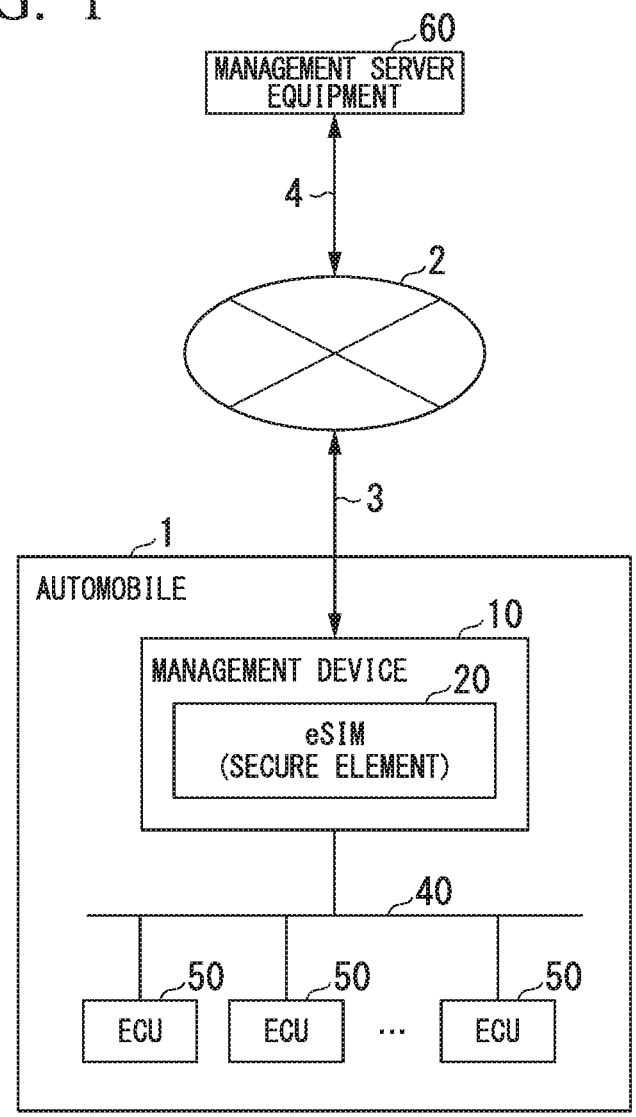
FIG. 1 is a schematic diagram of a management system according to the first embodiment of the present invention.

FIG. 1 is a schematic diagram of a management system according to the first embodiment of the present invention. In FIG. 1, the management system includes a management device 10 and management server equipment 60. The management device 10 is installed in an automobile 1. The management server equipment 60 is installed in a common carrier for a wireless communication network 2.

An eSIM (Embedded Subscriber Identify Module) or a SIM (Subscriber Identify Module) is needed to use the wireless communication network 2. The management device 10 includes an eSIM_20. The eSIM_20 is an eSIM having written subscriber information for the wireless communication network 2. Therefore, the management device 10 is allowed to use the wireless communication network 2 by use of the eSIM_20. The management device 10 is connected to the wireless communication network 2 through a wireless communication line 3 established by use of the eSIM_20.

The management server equipment 60 is connected to the wireless communication network 2 through a communication line 4 provided by the common carrier of the wireless communication network 2. The management device 10 and the management server equipment 60 can communicate with each other through the wireless communication network 2.

In this connection, it is possible to establish an exclusive line using the wireless communication network 2 between the management device 10 and the management server equipment 60, and therefore it is possible for the management device 10 and the management server equipment 60 to receive or transmit data through the exclusive line.

In the automobile 1, the management device 10 is connected to an onboard control network 40. As the onboard control network 40, for example, it is possible to use CAN (Controller Area Network). The present embodiment uses CAN as the onboard control network 40. Various types of ECUs 50 are connected to the onboard control network 40. Herein, the ECU 50 is an onboard computer installed in the automobile 1. As the ECUs 50, for example, it is possible to mention a drive ECU, a body ECU, and a security control ECU. The management device 10 can exchange data with the ECUs 50 through the onboard control network 40. Each ECU 50 can exchange data with other ECUs 50 through the onboard control network 40.

Figure 2:
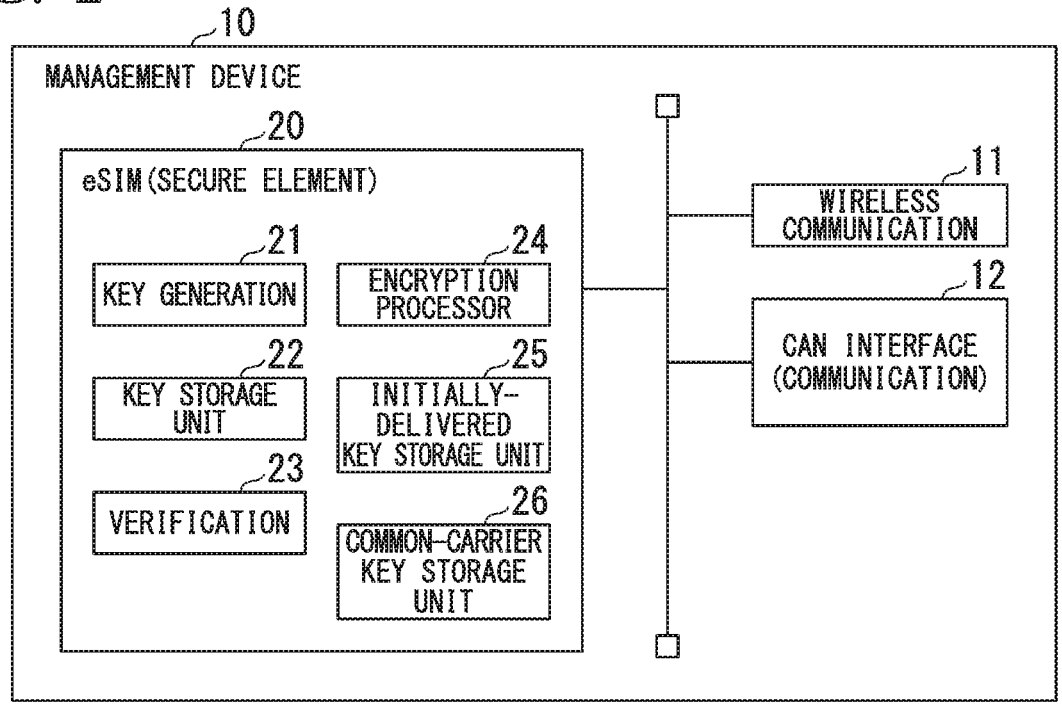
FIG. 2 is a block diagram of a management device according to the first embodiment.

FIG. 2 is a block diagram of the management device 10 according to the first embodiment. In FIG. 2, the management device 10 includes an eSIM_20, a wireless communication part 11, and a CAN interface 12. These parts are configured to exchange data with each other. The eSIM_20 includes a key generation part 21, a key storage unit 22, a verification part 23, an encryption processor 24, an initially-delivered key storage unit 25, and a common-carrier key storage unit 26.

The eSIM_20 is a secure element. The secure element includes a secure area inaccessible by any external device outside the secure element. In the eSIM_20, the key storage unit 22, the initially-delivered key storage unit 25, and the common-carrier key storage unit 26 are set to the secure area. In this connection, it is possible to use a SIM instead of the eSIM_20 as a secure element. The eSIM and the SIM are each regarded as one type of computer which can achieve desired functions according to computer programs.

The wireless communication part 11 transmits or receives data by wireless communication. Herein, the eSIM_20 is an eSIM having written subscriber information for the wireless communication network 2. Therefore, the wireless communication part 11 is connected to the wireless communication network 2 through the wireless communication line 3 by use of the eSIM_20. The CAN interface 12 is a communication part that can communicate with the ECUs 50. The CAN interface 12 is connected to the onboard control network 40 so as to exchange data with the ECUs 50 through the onboard control network 40.

In the eSIM_20, the key generation part 21 generates keys. The key storage unit 22 stores keys. The verification part 23 verifies exchanged keys. The encryption processor 24 encrypts data and then decrypts the encrypted data. The initially-delivered key storage unit 25 stores initially-delivered keys. The common-carrier key storage unit 26 stores common-carrier keys.

As keys generated by the key generation part 21, the present embodiment refers to two types of keys, i.e. an ECU-management key and an ECU key. For example, ECU-management keys are used to update keys such as ECU keys with the ECUs 50. For example, ECU keys are used for the processing of the security of ECUs 50. For example, ECU keys are used for encryption and decryption of data as well as mutual authentication of ECUs 50.

The key generation part 21 generates an ECU-management key and an ECU key at a predetermined timing. The timing of generating an ECU-management key may be identical to or different from the timing of generating an ECU key. According to a key generating request given by an external device outside the eSIM_20, the key generation part 21 may generates either an ECU-management key or an ECU key or both the ECU-management key and the ECU key. Alternatively, the key generation part 21 may repeatedly generate a pair of an ECU-management key and an ECU key.

Figure 3:
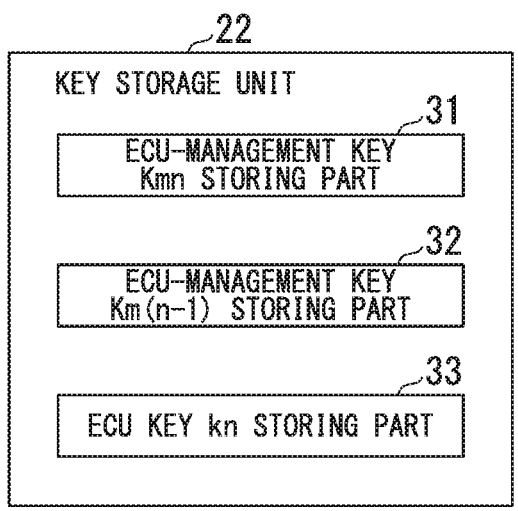
FIG. 3 is a block diagram of a key storage unit according to the first embodiment.

The key storage unit 22 stores ECU-management keys and ECU keys generated by the key generation part 21. FIG. 3 is a block diagram of the key storage unit 22 according to the first embodiment. In FIG. 3, the key storage unit 22 includes an ECU-management key Kmn storing part 31, an ECU-management key Km(n−1) storing part 32, and an ECU key kn storing part 33.

The ECU-management key Kmn storing part 31 stores the latest ECU-management key Kmn among ECU-management keys generated by the key generation part 21. The ECU-management key Km(n−1) storing part 32 stores an ECU-management key Km(n−1) preceding the latest ECU-management key among ECU keys generated by the key generation part 21. The ECU key kn storing part 33 stores the latest ECU key kn among ECU keys generated by the key generation part 21.

Figure 4A:
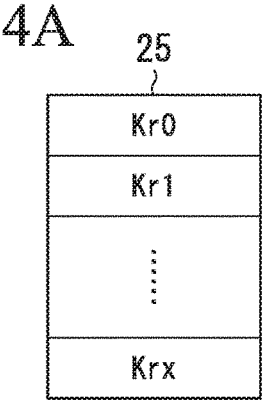
FIG. 4A is a configuration diagram of an initially-delivered key storage unit according to the first embodiment.
Figure 4B:
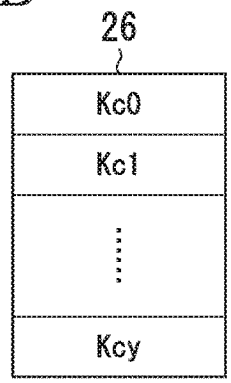
FIG. 4B is a configuration diagram of a common-carrier key storage unit according to the first embodiment.

FIGS. 4A and 4B are configuration diagrams showing the initially-delivered key storage unit 25 and the common-carrier key storage unit 26 according to the first embodiment.

In FIG. 4A, the initially-delivered key storage unit 25 stores "x+1" sets of initially-delivered keys, i.e. Kr0, Kr1, . . . , Krx. Herein, x denotes an integer equal to or above zero. The initially-delivered keys Kr0, Kr1, . . . , Krx are candidates of initially-delivered keys held by the ECUs 50. The ECUs 50 have been written initially-delivered keys when manufacturing or shipping the ECUs 50 or when the ECUs 50 are installed in the automobile 1. Normally, it is necessary to generate multiple sets of initially-delivered keys. Each ECU 50 is written an initially-delivered key selected from among multiples sets of initially-delivered keys. The initially-delivered keys Kr0, Kr1, . . . , Krx may serve as candidates of initially-delivered keys to be written into the ECUs 50.

First, second, and third examples will be described with respect to issuance patterns of initially-delivered keys.

(First Example of Issuance Pattern of Initially-Delivered Keys)

The common carrier of the wireless communication network 2 issues the initially-delivered keys Kr0, Kr1, . . . , Krx. The initially-delivered keys Kr0, Kr1, . . . , Krx are delivered to the manufacturer of the ECUs 50 and the manufacturer of the automobile 1. The common carrier of the wireless communication network 2 writes each of the initially-delivered keys Kr0, Kr1, . . . , Krx into the eSIM_20. The eSIM_20 stores each of the initially-delivered keys Kr0, Kr1, ..., Krx on the initially-delivered key storage unit 25. Specifically, the initially-delivered keys Kr0, Kr1, ..., Krx are each selected by the manufacturer of the ECUs 50 or the manufacturer of the automobile 1 and then written into the ECUs 50. The ECUs 50 hold the initially-delivered keys written therein.

(Second Example of Issuance Pattern of Initially-Delivered Keys)

The manufacturer of the automobile 1 issues the initially-delivered keys Kr0, Kr1, ..., Krx. The initially-delivered keys Kr0, Kr1, ..., Krx are delivered to the common carrier of the wireless communication network 2. The common carrier of the wireless communication network 2 writes each of the initially-delivered keys Kr0, Kr1, ..., Krx into the eSIM_20. The eSIM_20 stores each of the initially-delivered keys Kr0, Kr1, ..., Krx on the initially-delivered key storage unit 25. That is, the initially-delivered keys Kr0, Kr1, ..., Krx are each selected by the manufacturer of the automobile 1 and then written into the ECUs 50. The ECUs 50 hold the initially-delivered keys written therein. Alternatively, the initially-delivered keys Kr0, Kr1, ..., Krx are delivered to the manufacturer of the ECUs 50. The initially-delivered keys Kr0, Kr1, ..., Krx are each selected by the manufacturer of the ECUs 50 and then written into the ECUs 50. The ECUs 50 hold the initially-delivered keys written therein.

(Third Example of Issuance Pattern of Initially-Delivered Keys)

The manufacturer of the ECUs 50 issues the initially-delivered keys Kr0, Kr1, ..., Krx. The initially-delivered keys Kr0, Kr1, ..., Krx are delivered to the common carrier of the wireless communication network 2. The common carrier of the wireless communication network 2 writes each of the initially-delivered keys Kr0, Kr1, ..., Krx into the eSIM_20. The eSIM_20 stores each of the initially-delivered keys Kr0, Kr1, ..., Krx on the initially-delivered key storage unit 25. The initially-delivered keys Kr0, Kr1, ..., Krx are each selected by the manufacturer of the ECUs 50 and then written into the ECUs 50. The ECUs 50 hold the initially-delivered keys written therein. Alternatively, the initially-delivered keys Kr0, Kr1, ..., Krx are delivered to the manufacturer of the automobile 1. The initially-delivered keys Kr0, Kr1, ..., Krx are each selected by the manufacturer of the automobile 1 and then written into the ECUs 50. The ECUs 50 hold the initially-delivered keys written therein.

In order to prevent leakage of the initially-delivered keys Kr0, Kr1, ..., Krx, it is preferable for the common carrier of the wireless communication network 2, the manufacturer of the ECUs 50, and the manufacturer of the automobile 1 to carefully deal with the initially-delivered keys Kr0, Kr1, ..., Krx.

In FIG. 4B, the common-carrier key storage unit 26 stores "y+1" sets of common-carrier keys Kc0, Kc1, ..., Kcy. Herein, y is an integer equal to or above zero. The common-carrier keys Kc0, Kc1, ..., Kcy serve as candidates of common-carrier keys to be each by the eSIM_20 accessing the wireless communication network 2. The common-carrier keys Kc0, Kc1, ..., Kcy are each written into the eSIM_20 when manufacturing or shipping the eSIM_20 or when the eSIM_20 is installed in the management device 10. The eSIM_20 stores each of the common-carrier keys Kc0, Kc1, ..., Kcy on the common-carrier key storage unit 26. In addition, one common-carrier key to be used among the common-carrier keys Kc0, Kc1, ..., Kcy is set to the eSIM_20. According to the setting, the eSIM_20 selects one common-carrier key from among the common-carrier keys Kc0, Kc1, ..., Kcy so as to use the selected common-carrier key. The common carrier of the wireless communication network 2 records the information specifying the common carrier used by the eSIM_20.

Figure 5:
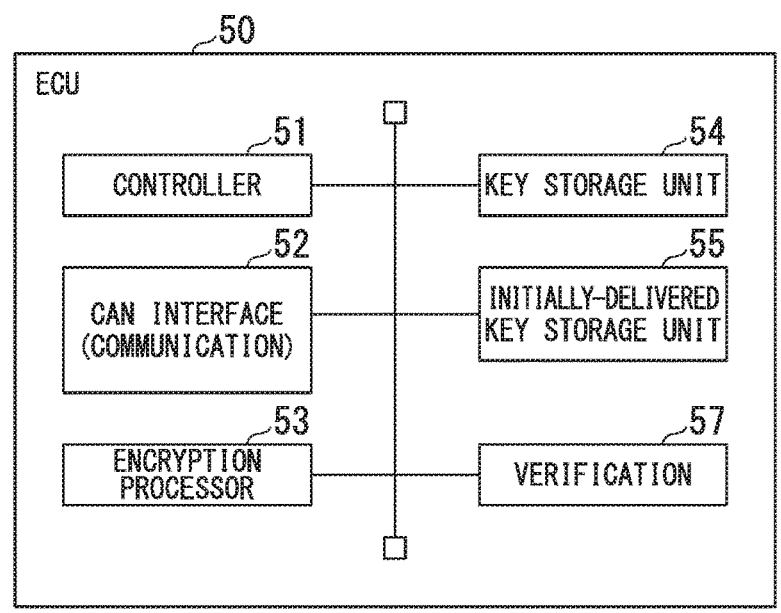
FIG. 5 is a block diagram of an ECU according to the first embodiment.

FIG. 5 is a block diagram of the ECU 50 according to the first embodiment. In FIG. 5, the ECU 50 includes a controller 51, a CAN interface 52, an encryption processor 53, a key storage unit 54, an initially-delivered key storage unit 55, and a verification part 57. These parts are configured to exchange data with each other.

The controller 51 has predetermined control functions. The CAN interface 52 is a communication part configured to communicate with the management device 10 and other ECUs 50. The CAN interface 52 is connected to the onboard control network 40, and therefore it can exchange data with the management device 10 and other ECUs 50 through the onboard control network 40.

The encryption processor 53 encrypts data and decrypts the encrypted data. The key storage unit 54 stores keys. As the keys stored on the key storage unit 54, the present embodiment refers to two types of keys, i.e. ECU-management keys and ECU keys. The initially-delivered key storage unit 55 stores initially-delivered keys. The verification part 57 verifies exchanged data.

Figure 6:
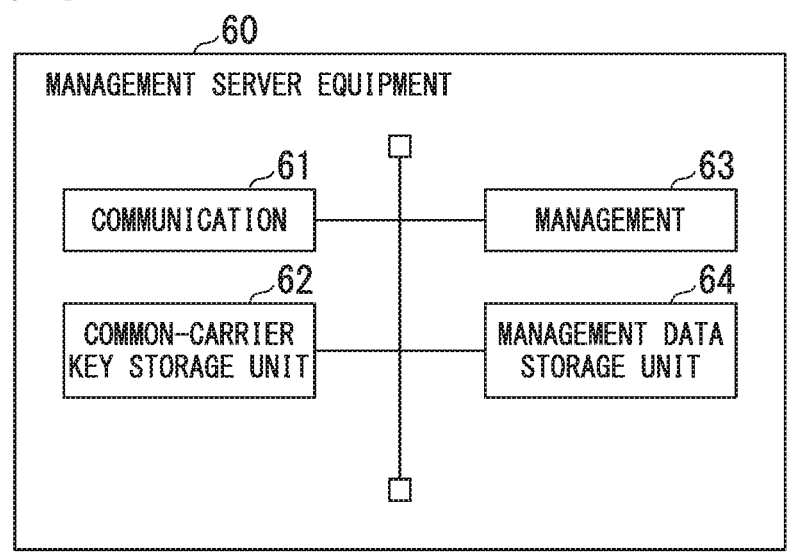
FIG. 6 is a block diagram of management server equipment according to the first embodiment.

FIG. 6 is a block diagram of the management server equipment 60 according to the first embodiment. In FIG. 6, the management server equipment 60 includes a communication part 61, a common-carrier key storage unit 62, a management part 63, and a management data storage unit 64. Those parts are configured to exchange data with each other. The communication part 61 receives or transmits data through the communication line 4. The communication part 61 is connected to the wireless communication network 2 through the communication line 4. The common-carrier key storage unit 62 stores common-carrier keys. The management part 63 manages the automobile 1. The management data storage unit 64 stores management data relating to the automobile 1.

Next, a management method according to the first embodiment will be described below. In the following description, the management device 10 of the automobile 1 receives or transmits data with the management server equipment 60 through the wireless communication network 2. The management device 10 receives or transmits data with the ECUs 50 through the onboard control network 40. The eSIM_20 of the management device 10 receives or transmits data with the ECUs 50 through the CAN interface 12. Various parts of the ECU 50 receive or transmit data with the eSIM_20 of the management device 10 through the CAN interface 52.

(First Example of Updating Method of ECU-Management Keys)

Figure 7:
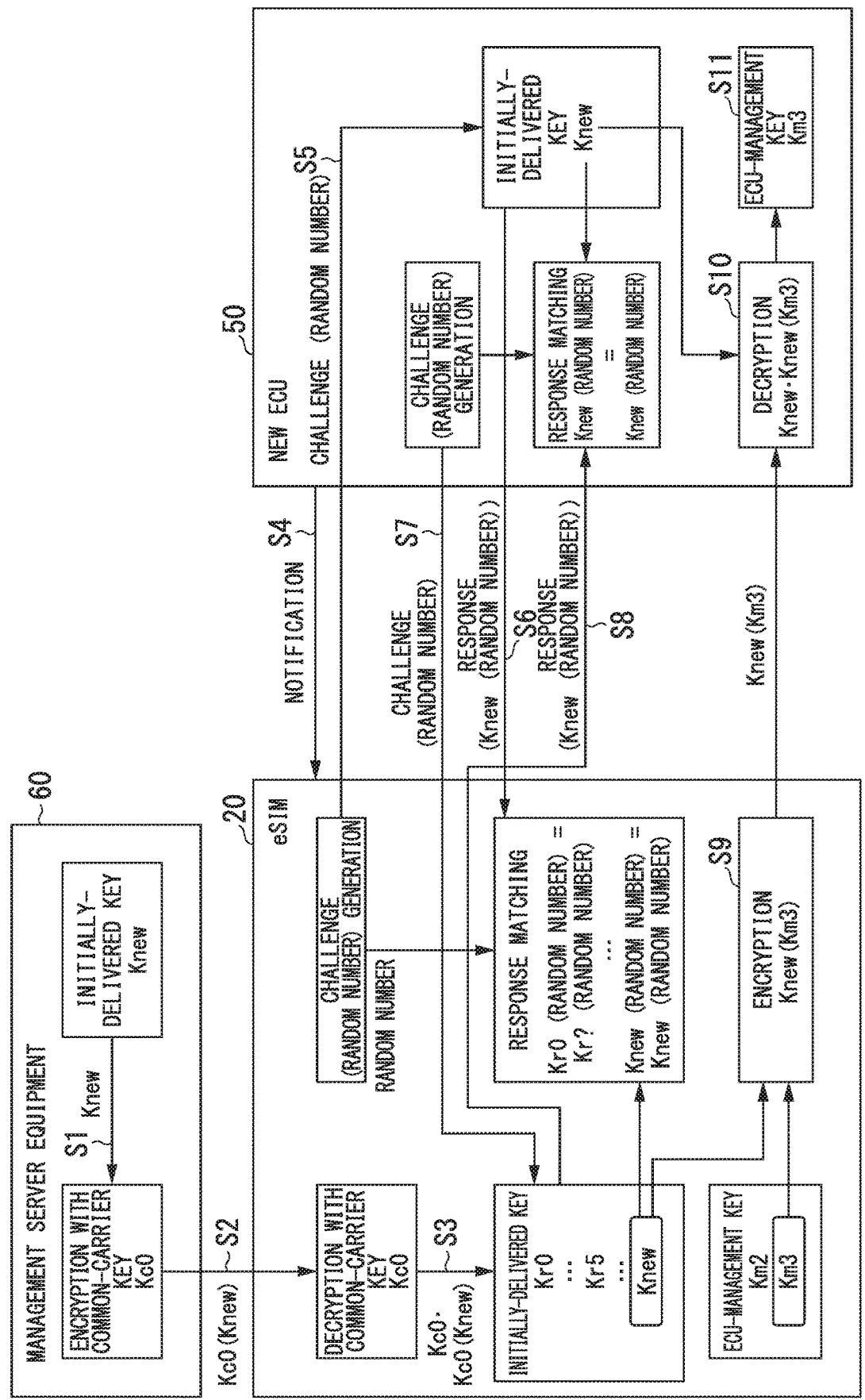
FIG. 7 is a sequence chart showing a first example of an updating method of ECU-management keys according to the first embodiment.

FIG. 7 is a sequence chart showing a first example of an updating method of ECU-management keys according to the first embodiment. The first example of an updating method of ECU-management keys is regarded as an updating method of ECU-management keys in respect of new installation of an ECU 50 with the automobile 1. The newly installed ECU 50 of the automobile 1 will be referred to as a new ECU 50.

For example, the situation for applying the first example of an updating method of ECU-management keys would be regarded as the situation that, after installation of the eSIM_20 in the automobile 1, a new ECU 50 having a new initially-delivered key Knew, which is not stored on the initially-delivered key storage unit 25 of the eSIM_20, is installed in the automobile 1. The new ECU 50 stores the initially-delivered key Knew on the initially-delivered key storage unit 55 thereof.

FIG. 7 shows a procedure introduced between the eSIM_20 of the management device 10 of the automobile 1 and the management server equipment 60 and a procedure introduced between the eSIM_20 of the management device 10 of the automobile 1 and the ECU(s) 50.

In the eSIM_20, the ECU-management key Kmn storing part 31 of the key storage unit 22 stores a latest ECU-management key Km3 among ECU-management keys generated by the key generation part 21. The ECU-management key Km(n−1) storing part 32 of the key storage unit 22 stores an ECU-management key Km2 preceding the latest ECU-management key Km3 among ECU-management keys generated by the key generation part 21.

Hereinafter, the first example of an updating method of ECU-management keys will be described with reference to FIG. 7.

(Step S1)

The management server equipment 60 receives an instruction to deliver the new initially-delivered key Knew.

(Step S2)

The management part 63 of the management server equipment 60 generates encrypted data Kc0(Knew), which is produced by encrypting the initially-delivered key Knew with the common-carrier key Kc0 used for the eSIM_20. The information specifying the common-carrier key Kc0 used for the eSIM_20 has been recorded by the common carrier of the wireless communication network 2. Based on the record, the management part 63 retrieves the common-carrier key Kc0 used for the eSIM_20 from the common-carrier key storage unit 62. The communication part 61 of the management server equipment 60 transmits the encrypted data Kc0(Knew) to the eSIM_20 of the management device 10 of the automobile 1 through the wireless communication network 2.

(Step S3)

In the eSIM_20 of the management device 10 of the automobile 1, the encryption processor 24 decrypts the encrypted data Kc0(Knew) from the management server equipment 60 with the common-carrier key Kc0. According to the setting of the eSIM_20, the encryption processor 24 retrieves the common-carrier key Kc0 used for decryption of the encrypted data Kc0(Knew) from the common-carrier key storage unit 26. As a result of decrypting the encrypted data Kc0(Knew), it is possible to obtain the initially-delivered key Knew. The initially-delivered key Knew, as the decryption result of the encrypted data Kc0(Knew), is additionally stored on the initially-delivered key storage unit 25.

(Step S4)

The controller 51 of the new ECU 50 sends an installation-notifying message, which notifies the installation of the new ECU 50 with the automobile 1, to the eSIM_20. The eSIM_20 receives the installation-notifying message sent from the new ECU 50.

(Step S5)

The verification part 23 of the eSIM_20 generates a random number as a challenge. The eSIM_20 sends the challenge (random number) to the new ECU 50 serving as the source of sending the installation-notifying message.

(Step S6)

The encryption processor 53 of the new ECU 50 generates the encrypted data Knew (random number) by encrypting the challenge from the eSIM_20 with the initially-delivered key stored on the initially-delivered key storage unit 55. The new ECU 50 sends the encrypted data Knew(random number as a response to the eSIM_20.

The verification part 23 of the eSIM_20 carries out a response-matching process for the response Knew (random number) from the new ECU 50. In the response-matching process, the verification part 23 verifies the response Knew (random number) by use of the initially-delivered keys Kr0, Kr1, . . . , Knew stored on the initially-delivered key storage unit 25. As a verification method of the response Knew (random number), it is possible to mention first and second examples of verification methods described below.

(First Example of Verification Method)

The verification part 23 determines whether or not each of encryption results matches the response Knew (random number) by encrypting the challenge (random number) with each of the initially-delivered keys Kr0, Kr1, . . . , Knew stored on the initially-delivered key storage unit 25. The verification part 23 may successfully verify the response Knew (random number) when the determination result indicates that one encryption result solely matches the response Knew (random number). On the other hand, the verification part fails to verify the response Knew (random number) when the determination result indicates that no encryption result matches the response Knew (random number) or that multiple encryption results match the response Knew (random number).

(Second Example of Verification Method)

The verification part 23 determines whether or not each of decryption results matches the challenge (random number) by decrypting the response Knew (random number) with each of the initially-delivered keys Kr0, Kr1, . . . , Knew stored on the initially-delivered key storage unit 25. The verification part 23 may successfully verify the response Knew (random number) when the determination result indicates that one decryption result solely matches the challenge (random numb).

On the other hand, the verification part 23 fails to verify the response Knew (random number) when the determination result indicates that no decryption result matches the challenge (random number) or that multiple decryption results match the challenge (random number).

When the verification part 23 successfully verifies the response Knew (random number), the management system proceeds to subsequent steps. In contrast, when the verification part 23 fails to verify the response Knew (random number), the management system exits the processing of FIG. 7. In this connection, it is possible to carry out a predetermined error process when the verification part 23 fails to verify the response Knew (random number).

(Step S7)

The verification part 57 of the new ECU 50 generates a random number as a challenge. The new ECU 50 sends the challenge (random number) to the eSIM_20.

(Step S8)

The encryption processor 24 of the eSIM_20 generates the encrypted data Knew (random number) by encrypting the challenge (random number) from the new ECU 50 with the initially-delivered key Knew used for successful verification of the response Knew (random number) in step S6. The eSIM_20 sends the encrypted data Knew (random number) as a response to the new ECU 50.

The verification part 57 of the new ECU 50 carries out a response-matching process for the response Knew (random number) from the eSIM_20. In the response-matching process, the verification part 57 verifies the response Knew (random number) by use of the initially-delivered key Knew stored on the initially-delivered key storage unit 55. As a verification method of the response Knew (random number), it is possible to mention the foregoing first and second examples of verification methods.

When the verification part 57 successfully verifies the response Knew (random number), the management system proceeds to subsequent steps. In contrast, when the verification part 57 fails to verify the response Knew (random number), the management system exits the processing of FIG. 7. In this connection, it is possible to carry out a predetermined error process when the verification part 57 fails to verify the response Knew (random number).

(Step S9)

The encryption processor 24 of the eSIM_20 generates an encrypted ECU-management key Knew(Km3) by encrypting the ECU-management key Km3 stored on the ECU-management key Kmn storing part 31 of the key storage unit 22 by use of the initially-delivered key Knew used for successful verification of the response Knew (random number) in step S6. The eSIM_20 sends the encrypted ECU-management key Knew(Km3) to the new ECU 50.

(Step S10)

The encryption processor 53 of the new ECU 50 decrypts the encrypted ECU-management key Knew(Km3) from the eSIM_20 with the initially-delivered key Knew stored on the initially-delivered key storage unit 55. As a decryption result, it is possible to obtain the ECU-management key Km3.

(Step S11)

The key storage unit 54 of the new ECU 50 stores the ECU-management key Km3 as the decryption result of the encryption processor 53. Thus, it is possible to update the ECU-management key stored on the key storage unit 54 of the new ECU 50 with the latest ECU-management key Km3.

According to the aforementioned first example of an updating method of ECU-management keys, it is possible to update the ECU-management key with the latest ECU-management key with respect to the new ECU 50 installed in the automobile 1 when the new ECU 50 having the new initially-delivered key Knew, which is not stored on the initially-delivered key storage unit 25 of the eSIM_20 installed in the automobile 1, is installed in the automobile 1. Thus, it is possible to adjust the ECU-management key held by each ECU 50 to the latest ECU-management key.

In addition, the ECU-management key is encrypted using the initially-delivered key Knew shared between the eSIM_20 and the new ECU 50, and therefore the encrypted ECU-management key is sent from the eSIM_20 to the new ECU 50. Thus, it is possible to improve security in updating ECU-management keys.

Moreover, the new initially-delivered key Knew, which is not stored on the initially-delivered key storage unit 25 of the eSIM_20 installed in the automobile 1, is wirelessly transmitted from the management server equipment 60 to the eSIM_20, and therefore initially-delivered key Knew wirelessly received by the eSIM_20 is additionally stored on the initially-delivered key storage unit 25 of the eSIM_20. This eliminates the time and labor for an operator to input the initially-delivered key Knew to the management device 10 through the OBD port of the automobile 1 in an automobile repair shop or the like.

(Second Example of Updating Method of ECU-Management Keys)

Figure 8:
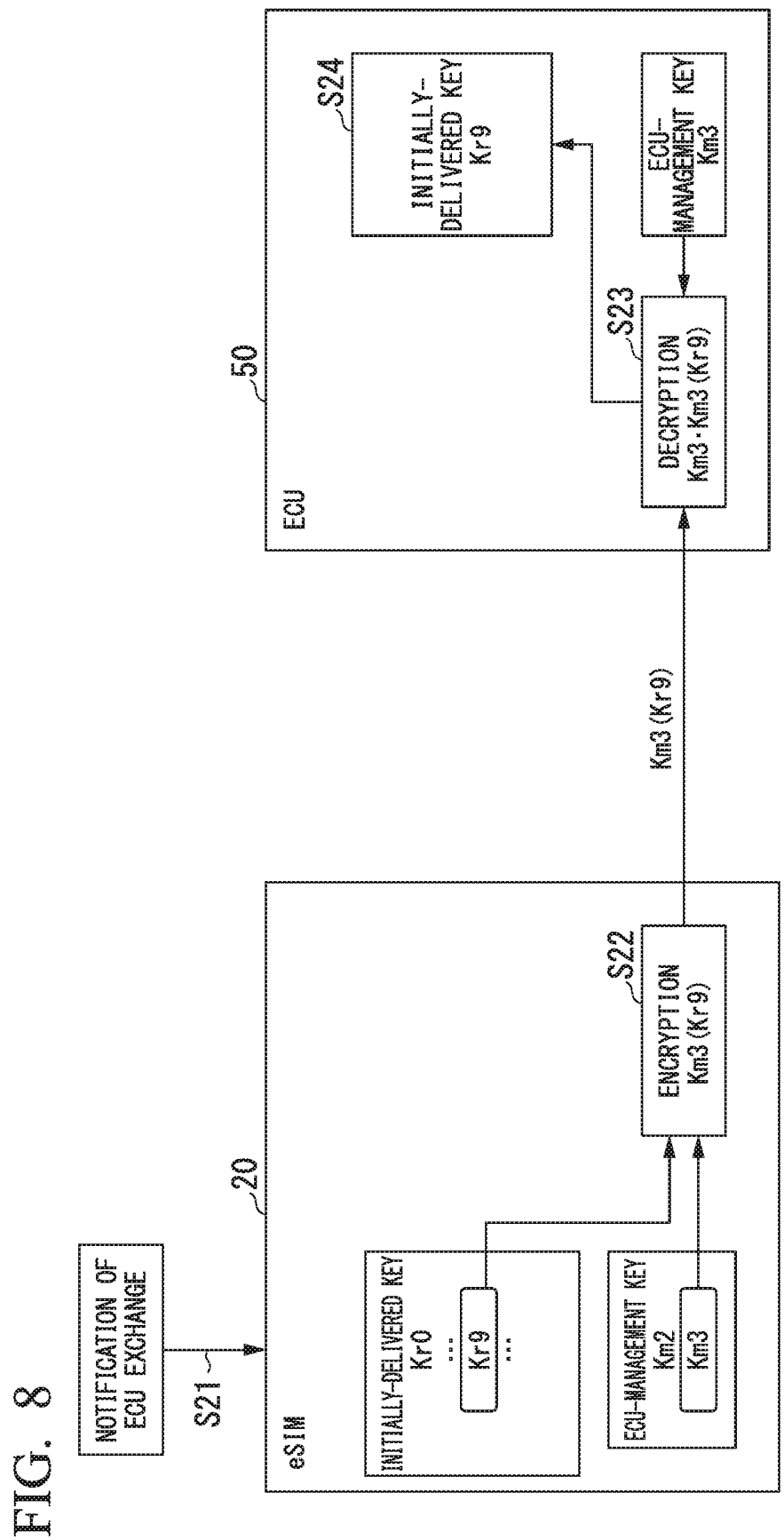
FIG. 8 is a sequence chart showing a second example of an updating method of ECU-management keys according to the first embodiment.
Figure 9:
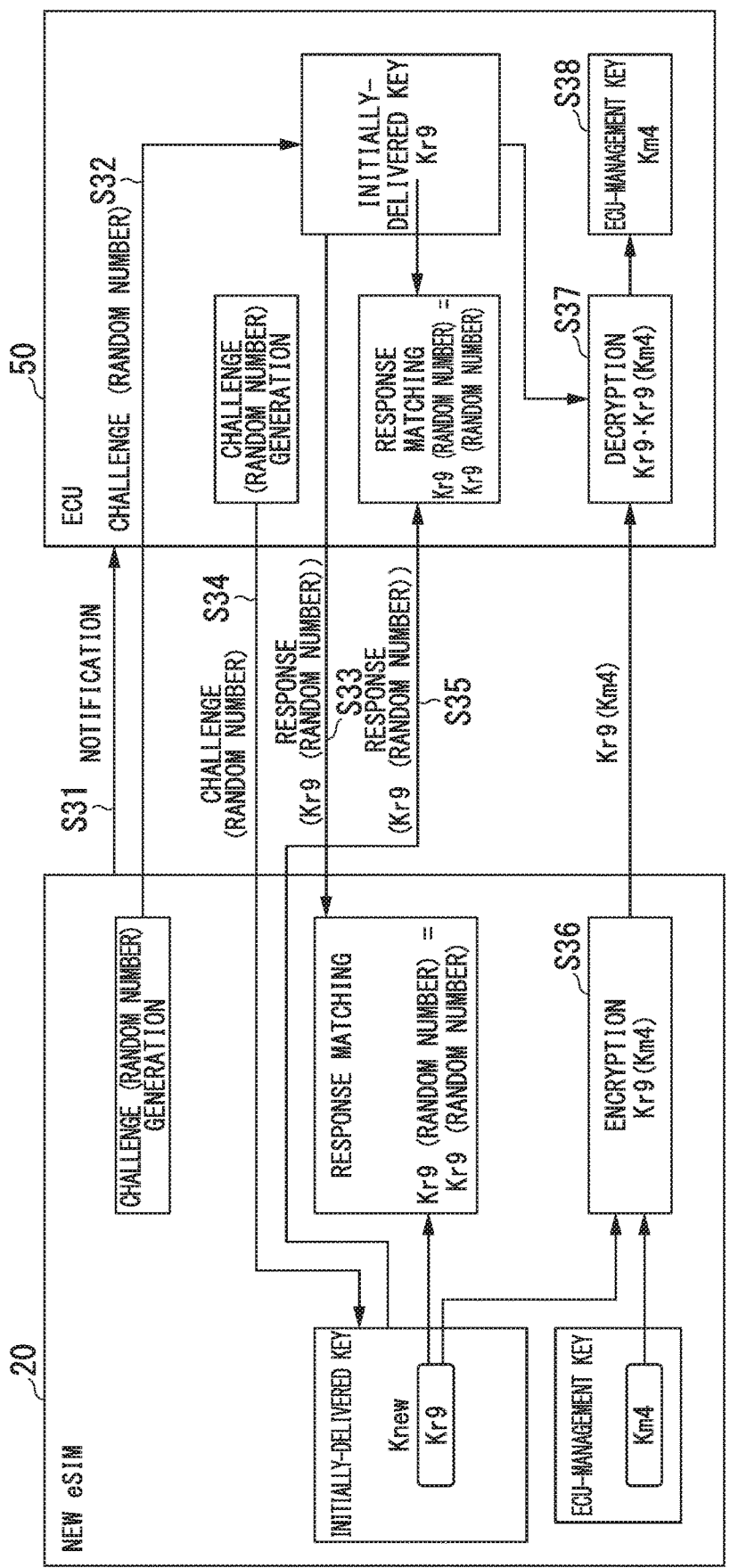
FIG. 9 is a sequence chart showing the second example of an updating method of ECU-management keys according to the first embodiment.
Figure 10:
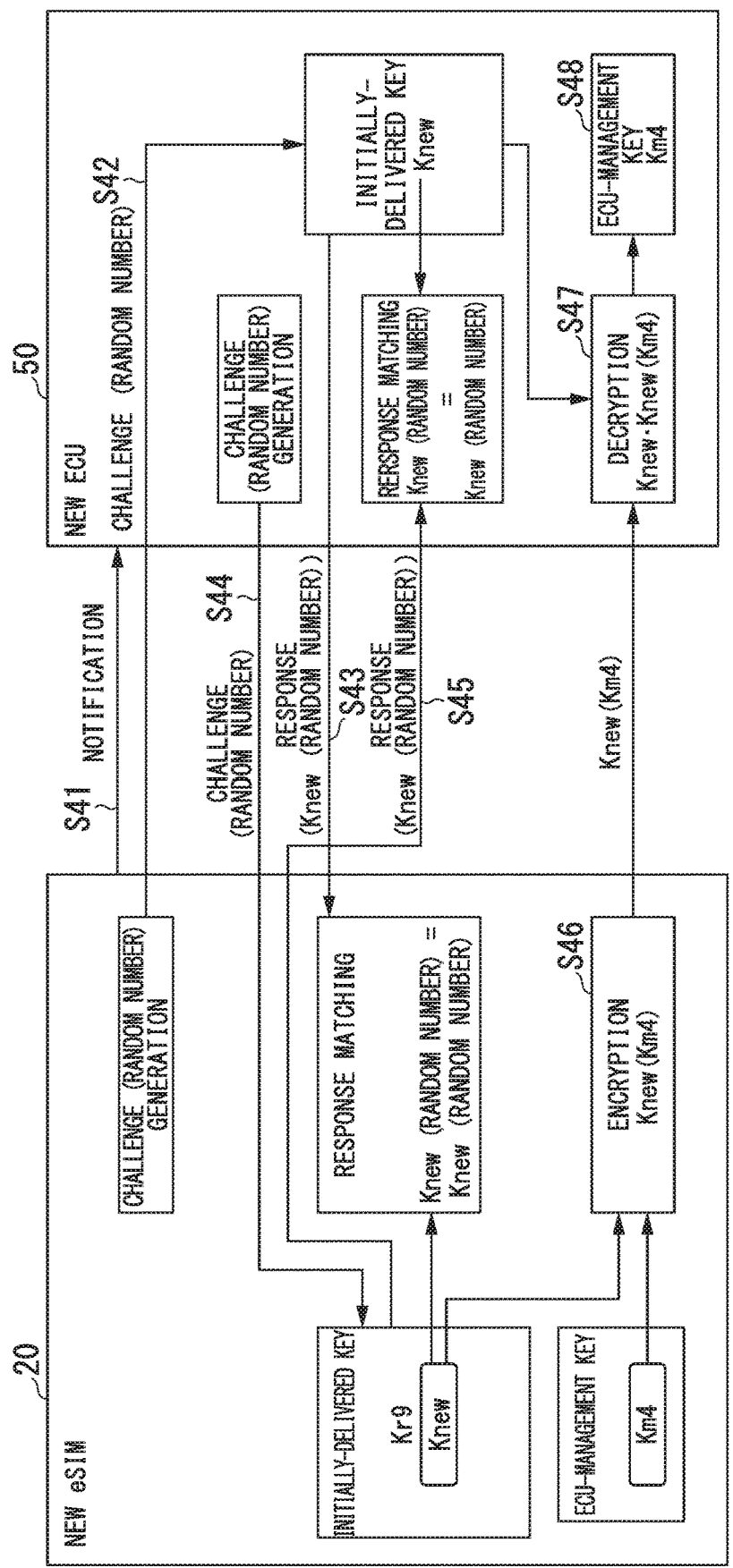
FIG. 10 is a sequence chart showing the second example of an updating method of ECU-management keys according to the first embodiment.

FIGS. 8, 9, and 10 are sequence charts showing the second example of an updating method of ECU-management keys according to the first embodiment. The second example of an updating method of ECU-management keys is regarded as an updating method of ECU-management keys when the ECU 50 is newly installed in the automobile 1. The ECU 50 newly installed in the automobile 1 will be referred to as a new ECU 50.

For example, the situation for applying the second example of an updating method of ECU-management keys would be regarded as the situation that the new ECU 50 having the new initially-delivered key Knew, which is not stored on the initially-delivered key storage unit 25 of the eSIM_20, is installed in the automobile 1 after installation of the eSIM_20 in the automobile 1. The new ECU 50 stores the initially-delivered key Knew on the initially-delivered key storage unit 55 thereof. According to the second example of an updating method of ECU-management keys different from the first example of an updating method of ECU-management keys, it is necessary to substitute the eSIM_20 having the initially-delivered key Knew for the eSIM_20 used to install the new ECU 50 in the automobile 1. The eSIM_20 substituting previous one and newly installed in the automobile 1 will be referred to as a new eSIM_20. The new eSIM_20 stores the initially-delivered key Knew on the initially-delivered key storage unit 25 thereof.

FIG. 8 shows a procedure introduced between the management server equipment 60 and the prior-to-exchange eSIM_20 of the management device 10 of the automobile before exchange and a procedure introduced between the ECU 50 and the prior-to-exchange eSIM_20 of the management device 10 in the automobile 1. In the eSIM_20, the ECU-management key Kmn storing part 31 of the key storage unit 22 stores the latest ECU-management key Km3 among ECU-management keys generated by the key generation part 21. The ECU-management key Km(n−1) storing part 32 of the key storage unit 22 stores an ECU-management key Km2 preceding to the latest ECU-management key Km3 among ECU-management keys generated by the key generation part 21. The key storage unit 54 of the ECU 50 stores the ECU-management key Km3. Hereinafter, a first phase in the second example of an updating method of ECU-management keys will be described with reference to FIG. 8.

(Step S21)

The prior-to-exchange eSIM_20 of the management device 10 of the automobile 1 (hereinafter, simply referred to as the eSIM_20) receives an exchange notification of the ECU 50. For example, the exchange notification of the ECU 50 is input to the management device 10 from the ODB port of the automobile 1.

(Step S22)

The encryption processor 24 of the eSIM_20 generates an encrypted initially-delivered key Km3(Kr9) by encrypting a predetermined initially-delivered key Kr9 with the ECU-management key Km3 stored on the ECU-management key Kmn storing part 31 of the key storage unit 22. An agreement to use the initially-delivered key Kr9 responsive to an exchange notification of the ECU 50 has been set to the eSIM_20 in advance. The eSIM_20 sends the encrypted initially-delivered key Km3(Kr9) to the ECU 50.

(Step S23)

The encryption processor 53 of the ECU 50 decrypts the encrypted initially-delivered key Km3(Kr9) from the eSIM_20 by use of the ECU-management key Km3 stored on the key storage unit 54. As a decryption result, it is possible to obtain the initially-delivered key Kr9.

(Step S24)

The initially-delivered key storage unit 55 of the ECU 50 stores the initially-delivered key Kr9 serving as a decryption result of the encryption processor 53. Thus, it is possible to update the initially-delivered key stored on the initially-delivered key storage unit 55 with the initially-delivered key Kr9.

FIG. 9 shows a procedure introduced between the ECU 50 and the new eSIM_20 of the management device 10 in the automobile 1. The initially-delivered key storage unit 25 of the new eSIM_20 stores initially-delivered keys Kr9 and Knew. Hereinafter, the second phase in the second example of an updating method of ECU-management keys will be described with reference to FIG. 9.

(Step S31)

In the management device 10 of the automobile 1, the eSIM_20 is exchanged with the new eSIM_20. In this connection, it is possible to replace the management device 10 with another management device 10 having installed the new eSIM_20 therein. The new eSIM_20 sends to the ECU 50 an installation-notifying message notifying the installation of the new eSIM_20 in the automobile 1. The installation-notifying message of the new eSIM_20 is sent to all the ECUs 50 by way of broadcasting. The following description refers to a procedure relating to a single ECU 50, but the same procedure should be carried out with respect to all the ECUs 50.

(Step S32)

The verification part 23 of the new eSIM_20 generates a random number as a challenge. The new eSIM_20 sends the challenge (random number) to the ECU 50.

(Step S33)

The encryption processor 53 of the ECU 50 generates encrypted data Kr9 (random number) by encrypting the challenge (random number) from the new eSIM_20 with the initially-delivered key Kr9 stored on the initially-delivered key storage unit 55. The ECU 50 sends the encrypted data Kr9 (random number) as a response to the new eSIM_20.

The verification part 23 of the new eSIM_20 carries out a response-matching process for the response Kr9 (random number) from the ECU 50. In the response-matching process, the verification part 23 verifies the response Kr9 (random number) by use of the initially-delivered keys Kr9 and Knew stored on the initially-delivered key storage unit 25. As a verification method for the response Kr9 (random number), it is possible to mention the aforementioned first and second examples of verification methods.

When the verification part 23 successfully verities the response Kr9 (random number), the management system proceeds to subsequent steps. On the other hand, when the management system fails to verify the response Kr9 (random number), the management system exits the processing of FIG. 9 with respect to the ECU 50 serving as a source of sending the response Kr9 (random number), which results in a failure of verification. In this connection, when the verification part 23 fails to verify the response Kr9 (random number), it is possible to carry out a predetermined error process.

(Step S34)

The verification part 57 of the ECU 50 generates a random number as a challenge. The ECU 50 sends the challenge (random number) to the new eSIM_20.

(Step S35)

The encryption processor 24 of the new eSIM_20 generates encrypted data Kr9 (random number) by encrypting the challenge (random number) from the ECU 50 by use of the initially-delivered key Kr9 which is used to successfully verify the response Kr9 (random number) in step S33. The new eSIM_20 sends the encrypted data Kr9 (random number) as a response to the ECU 50.

The verification part 57 of the ECU 50 carries out a response-matching process for the response Kr9 (random number) from the new eSIM_20. In the response-matching process, the verification part 57 verifies the response Kr9 (random number) by use of the initially-delivered key Kr9 stored on the initially-delivered key storage unit 55. As a verification method of the response Kr9 (random number), it is possible to mention the aforementioned first and second examples of verification methods.

When the verification part 57 successfully verifies the response Kr9 (random number), the management system proceeds to subsequent steps. In contrast, when the verification part 57 fails to verify the response Kr9 (random number), the management system exits the processing of FIG. 9 with respect to the ECU 50 receiving the response Kr9 (random number) leading to a failure of verification. In this connection, it is possible to carry out a predetermined error process when the verification part 57 fails to verify the response Kr9 (random number).

(Step S36)

The key generation part 21 of the new eSIM_20 generates a new ECU-management key Km4. The ECU-management key Kmn storing part 31 of the key storage unit 22 stores the new ECU-management key Km4 generated by the key generation part 21. The encryption processor 24 of the new eSIM_20 generates an encrypted ECU-management key Kr9 (Km4) by encrypting the ECU-management key Km4 stored on the ECU-management key Kmn storing part 31 of the key storage unit 22 by use of the initially-delivered key Kr9 which is used for successful verification of the response Kr9 (random number) in step S33. The new eSIM_20 sends the encrypted ECU-management key Kr9 (Km4) to the ECU 50.

(Step S37)

The encryption processor 53 of the ECU 50 decrypts the encrypted ECU-management key Kr9 (Km4) from the new eSIM_20 with the initially-delivered key Kr9 stored on the initially-delivered key storage unit 55. As a decryption result, it is possible to obtain the ECU-management key Km4.

(Step S38)

The key storage unit 54 of the ECU 50 stores the ECU-management key Km4 as the decryption result of the encryption processor 53. Thus, it is possible to update the ECU-management key stored on the key storage unit 54 with the latest ECU-management key Km4.

FIG. 10 shows a procedure introduced between the new ECU 50 and the new eSIM_20 of the management device 10 in the automobile 1. The initially-delivered key storage unit 55 of the new ECU 50 stores the initially-delivered key Knew. Hereinafter, the third phase in the second example of an updating method of ECU-management keys will be described with reference to FIG. 10.

(Step S41)

The new ECU 50 receives an installation-notifying message which is sent from the new eSIM_20 by way of broadcasting in step S31.

(Step S42)

The verification part 23 of the new eSIM_20 generates a random number as a challenge. The new eSIM_20 sends the challenge (random number) to the new ECU 50.

(Step S43)

The encryption processor 53 of the new ECU 50 generates encrypted data Knew (random number) by encrypting the challenge (random number) from the new eSIM_20 with the initially-delivered key Knew stored on the initially-delivered key storage unit 55. The new ECU 50 sends the encrypted data Knew (random number) as a response to the new eSIM_20.

The verification part 23 of the new eSIM_20 carries out a response-matching process for the response Knew (random number) from the new ECU 50. In the response-matching process, the verification part 23 verifies the response Knew (random number) by use of the initially-delivered keys Kr9 and Knew stored on the initially-delivered key storage unit 25. As a verification method of the response Knew (random number), it is possible to mention the aforementioned first and second examples of verification methods.

When the verification part 23 successfully verifies the response Knew (random number), the management system proceeds to subsequent steps. In contrast, when the verification part 23 fails to verify the response Knew (random number), the management system exits the processing of FIG. 10 with respect to the new ECU 50 serving as a source of sending the response Knew (random number) leading to a failure of verification. In this connection, it is possible to carry out a predetermined error process when the verification part 23 fails to verify the response Knew (random number).

(Step S44)

The verification part 57 of the new ECU 50 generates a random number as a challenge. The new ECU 50 sends the challenge (random number) to the new eSIM_20.

(Step S45)

The encryption processor 24 of the new eSIM_20 generates encrypted data Knew (random number) by encrypting the challenge (random number) from the new ECU 50 by use of the initially-delivered key Knew used for successful verification of the response Knew (random number) in step S43. The new eSIM_20 sends the encrypted data Knew (random number) as a response to the new ECU 50.

The verification part 57 of the new ECU 50 carries out a response-matching process for the response Knew (random number) from the new eSIM_20. In the response-matching process, the verification part 57 verifies the response Knew (random number) by use of the initially-delivered key Knew stored on the initially-delivered key storage unit 55. As a verification method of the response Knew (random number), it is possible to mention the aforementioned first and second examples of verification methods.

When the verification part 57 successfully verifies the response Knew (random number), the management system proceeds to subsequent steps. In contrast, when the verification part 57 fails to verify the response Knew (random number), the management system exits the processing of FIG. 10 with respect to the new ECU 50 receiving the response value Knew (random number) leading to a failure of verification. In this connection, it is possible to carry out a predetermined error process when the verification part 57 fails to verify the response Kr9 (random number).

(Step S46)

The encryption processor 24 of the new eSIM_20 generates an encrypted ECU-management key Knew(Km4) by encrypting the ECU-management key Km4 stored on the ECU-management key Kmn storing part 31 of the key storage unit 22 by use of the initially-delivered key Knew used for successful verification of the response Knew (random number) in step S43. The new eSIM_20 sends the encrypted ECU-management key Knew(Km4) to the new ECU 50.

(Step S47)

The encryption processor 53 of the new ECU 50 decrypts the encrypted ECU-management key Knew(Km4) from the new eSIM_20 with the initially-delivered key Knew stored on the initially-delivered key storage unit 55. As a decryption result, it is possible to obtain the ECU-management key Km4.

(Step S48)

The key storage unit 54 of the new ECU 50 stores the ECU-management key Km4 as the decryption result of the encryption processor 53. Thus, it is possible to update the ECU-management key stored on the key storage unit 54 of the new ECU 50 with the latest ECU-management key Km4.

In the second example of an updating method of ECU-management keys, it is possible to carry out either the second phase or the third phase at first. Herein, either the second phase or the third phase to be executed at first may generate a new ECU-management key Km4.

According to the second example of an updating method of ECU-management keys, when a new ECU 50 has stored the new initially-delivered key Knew which is not stored on the initially-delivered key storage unit 25 of the eSIM_20 installed in the automobile 1, it is possible to update the ECU-management key with the latest ECU-management key with respect to the new ECU 50 installed in the automobile 1. Thus, it is possible to adjust each ECU-management key, which is held by each ECU 50 installed in the automobile 1, with the latest ECU-management key.

In addition, the ECU-management key is encrypted using the initially-delivered key Kr9 shared by the new eSIM_20 and the ECU 50, and therefore the encrypted ECU-management key is sent from the new eSIM_20 to the ECU 50. In addition, the ECU-management key is encrypted using the initially-delivered key Knew shared by the new eSIM_20 and the new ECU 50, and therefore the encrypted ECU-management key is sent from the new eSIM_20 to the new ECU 50. Thus, it is possible to improve security in updating ECU-management keys.

Moreover, the eSIM_20 not having stored the new initially-delivered key Knew is replaced with the new eSIM_20 having stored the new initially-delivered key Knew in the automobile 1; hence, it is possible to apply the present embodiment to any areas not serviced with wireless communication environments.

[Third Example of Updating Method of ECU-Management Keys]

Figure 11:
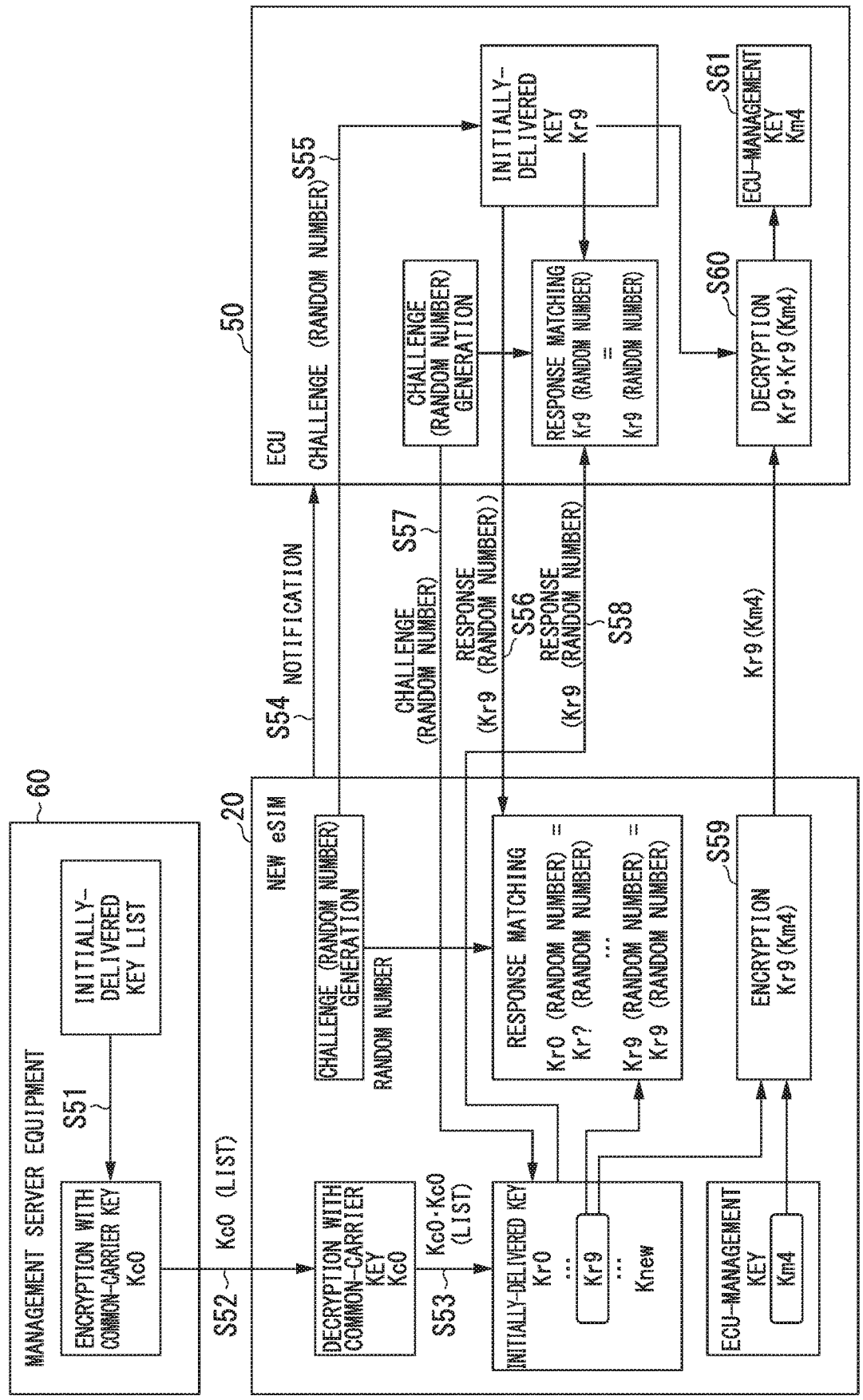
FIG. 11 is a sequence chart showing a third example of an updating method of ECU-management keys according to the first embodiment.

FIG. 11 is a sequence chart showing a third example of an updating method of ECU-management keys according to the first embodiment. The third example of an updating method of ECU-management keys is a variation of the second example of an updating method of ECU-management keys. According to the third example of an updating method of ECU-management keys, when a new eSIM_20 not having stored a new initially-delivered key Knew is newly installed in the automobile 1 due to replacement, the management server equipment 60 wirelessly transmits the new initially-delivered key Knew to the new eSIM_20.

FIG. 11 shows a procedure introduced between the management server equipment 60 and the new eSIM_20 of the management device 10 of the automobile 1 and a procedure introduced between the new eSIM_20 of the management device 10 and the ECU 50 in the automobile 1. Hereinafter, a first phase in the third example of an updating method of ECU-management keys will be described with reference to FIG. 11. In this connection, the first phase in the third example of an updating method of ECU-management keys corresponds to the second phase in the second example of an updating method of ECU-management keys shown in FIG. 9.

(Step S51)

The management server equipment 60 receives a delivery instruction relating to an initially-delivered key list including a new initially-delivered key Knew.

(Step S52)

The management part 63 of the management server equipment 60 generates encrypted data Kc0 (list) by encrypting the initially-delivered key list with a common-carrier key Kc0 used for the new eSIM_20. The common carrier of the wireless communication network 2 has recorded the information specifying the common-carrier key Kc0 used for the new eSIM_20. Based on the record, the management part 63 retrieves the common-carrier key Kc0 used for the new eSIM_20 from the common-carrier key storage unit 62. The communication part 61 of the management server equipment 60 transmits the encrypted data Kc0 (list) to the new eSIM_20 of the management device 10 of the automobile 1 through the wireless communication network 2.

(Step S53)

In the new eSIM_20 of the management device 10 of the automobile 1, the encryption processor 24 decrypts the encrypted data Kc0 (list) from the management server equipment 60 with the common-carrier key Kc0. According to the setting of the new eSIM_20, the encryption processor 24 retrieves the common-carrier key Kc0, which is used for decryption of the encrypted data Kc0 (list), from the common-carrier key storage unit 26. Thus, it is possible to obtain an initially-delivered key list as a result of decryption of the encrypted data Kc0 (list). The initially-delivered key list, i.e. a result of decryption of the encrypted data Kc0 (list), includes initially-delivered keys Kr0, . . . , Kr9, . . . , Knew, which are stored on the initially-delivered key storage unit 25.

A series of steps S54 to S61 in FIG. 11 correspond to a series of steps S31 to S38 in FIG. 9; hence, the foregoing process is carried out here. In the response-matching process of FIG. 11, however, the verification part 23 of the new eSIM_20 verifies the response Kr9 (random number) from the ECU 50 by use of the initially-delivered keys Kr0, . . . , Kr9, . . . , Knew stored on the initially-delivered key storage unit 25.

The second phase in the third example of an updating method of ECU-management keys is carried out in a similar manner as the third phase of the second example of an updating method of ECU-management keys. In the second phase of the third example of an updating method of ECU-management keys, however, the response-matching process, corresponding to the response-matching process of step S43 shown in FIG. 10, should be carried out such that the verification part 23 of the new eSIM_20 verifies the response Knew (random number) from the new ECU 50 by use of the initially-delivered keys Kr0, . . . , Kr9, . . . , Knew stored on the initially-delivered key storage unit 25.

According to the third example of an updating method of ECU-management keys, when the eSIM_20 is replaced with the new eSIM_20 in the automobile 1, it is possible to deliver an initially-delivered key list including the new initially-delivered key Knew from the management server equipment 60 to the new eSIM_20 by wireless communication.

According to the first embodiment, it is possible to obtain an effect of contributing to management and updating of keys held by the automobile 1.

Second Embodiment

Figure 12:
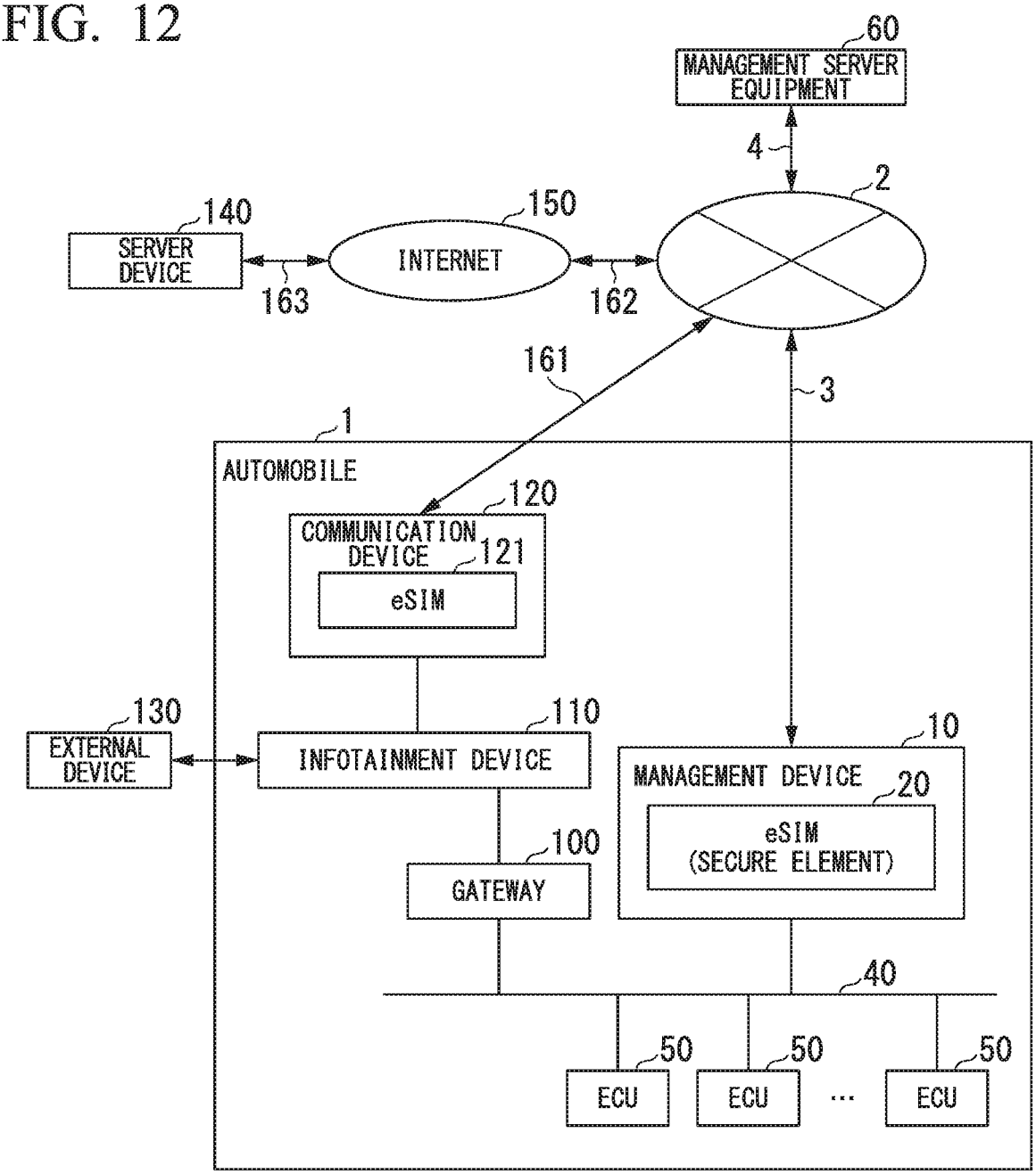
FIG. 12 is a schematic diagram of an automobile according to the second embodiment of the present invention.

FIG. 12 is a schematic diagram of the automobile 1 according to the second embodiment of the present invention. In FIG. 12, parts corresponding to those of FIG. 1 are denoted using the same reference signs; hence, their descriptions will be omitted here. Hereinafter, the automobile 1 according to the second embodiment will be described with reference to FIG. 12.

The automobile 1 shown in FIG. 12 further includes a gateway 100, an infotainment device 110, and a communication device 120 in addition to the foregoing parts of the automobile 1 shown in FIG. 1. The communication device 120 includes an eSIM_121. The eSIM_121 is an eSIM having written subscriber information of the wireless communication network 2. Therefore, the communication device 120 may access the wireless communication network 2 by use of the eSIM_121. That is, the communication device 120 is connected to the wireless communication network 2 through a wireless communication line 161 established by the eSIM_121. The wireless communication network 2 is connected to an Internet 150 through a communication line 162. A server device 140 is connected to the Internet 150 through a communication line 163. The communication device 120 communicates with the server device 140 connected to the Internet 150 through the wireless communication network 2.

In the automobile 1, the infotainment device 110 receives or transmits data with the server device 140 by means of the communication device 120. The infotainment device 110 is connected to an external device 130 so as to exchange data with the external device 130. As the external device 130, for example, it is possible to mention a mobile communication terminal, an audio-visual device, and the like.

In the automobile 1, the gateway 100 is connected to the onboard control network 40. The infotainment device 110 receives or transmits data with the management device 10 and the ECUs 50 connected to the onboard control network 40 through the gateway 100. The gateway 100 monitors the transmission/reception of data between the infotainment device 110 and the ECUs 50 and the transmission/reception of data between the infotainment device 110 and the management device 10.

Heretofore, the present invention has been described in detail by way of the foregoing embodiments with reference to the drawings; however, concrete configurations are not necessarily limited to those embodiments, and therefore the present invention may embrace any change in design not departing from essential matters thereof.

The foregoing embodiments adopt the eSIM or the SIM as an example of a secure element; but this is not a restriction. As a secure element, for example, it is possible to use tamper-resistant encryption processing chips. For example, encryption processing chips called TPM (Trusted Platform Module) are known as tamper-resistant encryption processing chips. For example, Non-Patent Literature 3 discloses TPM.

It is preferable to carry out secure boot with the management device 10 and the ECUs 50. According to secure boot, it is possible to verify the correctness of an operating system (OS) for a computer when started. For example, Non-Patent Literatures 4, 5, 6 disclose technologies of secure booting.

The management methods according to the foregoing embodiments can be applied to various scenes of managing the automobile 1 such as sales, periodic inspection, vehicle-inspection, resale, and cessation of the automobile 1.

The foregoing embodiments refers to automobiles as an example of vehicles, however, those embodiments can be applied to other types of vehicles other than automobiles, such as motorized two-wheel vehicles and railway vehicles.

In addition, it is possible to store computer programs which may implement steps of management methods executed by the ECUs 50 or the management server equipment 60 on computer-readable storage media, wherein computer systems may load programs stored on storage media so as to execute programs. Herein, the "computer system" may embrace the OS and the hardware such as peripheral devices.

The "computer-readable storage media" refer to flexible disks, magneto-optic disks, ROM, rewritable non-volatile memory such as flash memory, portable media such as DVD (Digital Versatile Disk), and storage units such as hard disks installed in computer system.

Moreover, the "computer-readable storage media" refer to any measures for temporarily holding programs such as non-volatile memory installed in computer systems acting as servers or clients upon receiving programs transmitted through telephone lines, communication lines, and networks such as the Internet.

The aforementioned programs may be transmitted from a computer system having storage units for storing programs to another computer system by means of transmission media or by way of propagating waves in transmission media. Herein, the "transmission media" for transmitting programs may refer to any media having functions to transmit information, e.g. networks (communication networks) such as the Internet, and communication lines such as telephone lines.

The aforementioned programs may achieve part of the foregoing functions. Alternatively, the aforementioned programs may be so-called differential files (or differential programs) which can be combined with pre-installed programs of computer systems so as to achieve the foregoing functions.

REFERENCE SIGNS LIST

1 automobile
2 wireless communication network
3 wireless communication line
4 communication line
10 management device
11 wireless communication part
12 CAN interface
20 eSIM
21 key generation part
22 key storage unit
23 verification part
24 encryption processor
25 initially-delivered key storage unit
26 common-carrier key storage unit
31 ECU-management key Kmn storing part
32 ECU-management key Km(n−1) storing part
33 ECU key kn storing part
40 onboard control network
50 ECU
51 controller
52 CAN interface
53 encryption processor
54 key storage unit
55 initially-delivered key storage unit
57 verification part
60 management server equipment
61 communication part
62 common-carrier key storage unit
63 management part
64 management data storage unit

The invention claimed is:

1. A management device, comprising:
an initially-delivered key storage configured to store a plurality of initially-delivered keys serving as candidates of initially-delivered keys in connection with a plurality of onboard computers installed in a vehicle;
a communication circuit configured to communicate with an onboard computer among the plurality of onboard computers installed in the vehicle to receive encrypted data from the onboard computer;
verification logic configured to verify the encrypted data using an initially-delivered key among the plurality of initially-delivered keys stored on the initially-delivered key storage; and
a wireless communication circuit configured to receive, from a management server equipment through a wireless communication network, a new initially-delivered key in connection with a new onboard computer newly installed in the vehicle,
wherein the initially-delivered key storage stores the new initially-delivered key received by the wireless communication circuit, and
wherein a management key utilized in updating a key used for an encrypted communication between the plurality of each onboard computer is updated via (i) through (v),
(i) verifying whether the new initially-delivered key is stored in the new onboard computer,
(ii) encrypting a latest management key using the new initially-delivered key,
(iii) sending the encrypted latest management key to the new onboard computer,
(iv) decrypting, by the new onboard computer, the encrypted latest management key using the new initially-delivered key, and
(v) storing, by the new onboard computer, the latest management key.

2. The management device according to claim 1, further comprising:
key generation logic configured to generate the management key utilized in updating the key for each onboard computer;
an encryption processor configured to generate an encrypted key by encrypting the key generated by the key generation logic; and
a key storage configured to store the key generated by the key generation logic,
wherein the communication circuit sends the encrypted key to an onboard computer successfully verified with the verification logic among the plurality of onboard computers installed in the vehicle.

3. The management device according to claim 2, which is configured of a secure element installed in the vehicle.

4. The management device according to claim 1, which is configured of a secure element installed in the vehicle.

5. A management device, comprising:
an initially-delivered key storage configured to store a plurality of initially-delivered keys in connection with a plurality of onboard computers installed in a vehicle and a new initially-delivered key in connection with a new onboard computer newly installed in the vehicle;
a communication circuit configured to communicate with the plurality of onboard computers installed in the vehicle; and verification logic configured to receive encrypted data from an onboard computer among the plurality of onboard computers installed in the vehicle via the communication circuit to verify the encrypted data with an initially-delivered key among the plurality of initially-delivered keys stored on the initially-delivered key storage, wherein a management key utilized in updating a key used for an encrypted communication between the plurality of each onboard computer is updated via (i) through (v), (i) verifying whether the new initially-delivered key is stored in the new onboard computer, (ii) encrypting a latest management key using the new initially-delivered key, (iii) sending the encrypted latest management key to the new onboard computer, (iv) decrypting, by the new onboard computer, the encrypted latest management key using the new initially-delivered key, and (v) storing, by the new onboard computer, the latest management key.

6. The management device according to claim 5, further comprising:

key generation logic configured to generate the management key utilized in updating the key for each onboard computer;

an encryption processor configured to generate an encrypted key by encrypting the key generated by the key generation logic; and a key storage configured to store the key generated by the key generation logic, wherein the communication circuit sends the encrypted key to an onboard computer successfully verified with the verification logic among the plurality of onboard computers installed in the vehicle.

7. The management device according to claim 6, which is configured of a secure element installed in the vehicle.

8. The management device according to claim 5, which is configured of a secure element installed in the vehicle.

9. A management method, comprising:

storing, in a management device, a plurality of initially-delivered keys serving as candidates of initially-delivered keys in connection with a plurality of onboard computers installed in a vehicle on an initially-delivered key storage;

communicating, by the management device, with an onboard computer among the plurality of onboard computers installed in the vehicle to receive encrypted data from the onboard computer;

verifying, by the management device, the encrypted data of an initially-delivered key among the plurality of initially-delivered keys stored on the initially-delivered key storage;

wirelessly communicating, by the management device, to receive a new initially-delivered key in connection with a new onboard computer newly installed in the vehicle from a management server equipment through a wireless communication network;

storing, in the initially-delivered key storage, the new initially-delivered key; and updating a management key utilized in updating a key used for an encrypted communication between the plurality of each onboard computer via (i) through (v), (i) verifying whether the new initially-delivered key is stored in the new onboard computer, (ii) encrypting a latest management key using the new initially-delivered key, (iii) sending the encrypted latest management key to the new onboard computer, (iv) decrypting, by the new onboard computer, the encrypted latest management key using the new initially-delivered key, and (v) storing, by the new onboard computer, the latest management key.

10. A management method, comprising:

storing, in an initially-delivered key storage of a management device, a plurality of initially-delivered keys in connection with a plurality of onboard computers installed in a vehicle and a new initially-delivered key in connection with a new onboard computer newly installed in the vehicle;

communicating, by the management device, to communicate with an onboard computer among the plurality of onboard computers installed in the vehicle to receive encrypted data from the onboard computer installed in the vehicle;

verifying, by the management device, the encrypted data with an initially-delivered key among a plurality of initially-delivered keys stored on the initially-delivered key storage; and updating a management key utilized in updating a key used for an encrypted communication between the plurality of each onboard computer via (i) through (v), (i) verifying whether the new initially-delivered key is stored in the new onboard computer, (ii) encrypting a latest management key using the new initially-delivered key, (iii) sending the encrypted latest management key to the new onboard computer, (iv) decrypting, by the new onboard computer, the encrypted latest management key using the new initially-delivered key, and (v) storing, by the new onboard computer, the latest management key.

11. A non-transitory computer-readable storing medium storing a computer program causing a computer to execute:

storing, in an initially-delivered key storage, a plurality of initially-delivered keys serving as candidates of initially-delivered keys in connection with a plurality of onboard computers installed in a vehicle;

communicating with an onboard computer among the plurality of onboard computers installed in the vehicle;

receiving, during the communicating, encrypted data from the onboard computer to verify the encrypted data utilizing an initially-delivered key among the plurality of initially-delivered keys stored on the initially-delivered key storage;

receiving, via wireless communication, a new initially-delivered key in connection with a new onboard computer newly installed in the vehicle from a management server equipment through a wireless communication network;

storing, in the initially-delivered key storage, the new initially-delivered key; and updating a management key utilized in updating a key used for an encrypted communication between the plurality of each onboard computer via (i) through (v), (i) verifying whether the new initially-delivered key is stored in the new onboard computer, (ii) encrypting a latest management key using the new initially-delivered key, (iii) sending the encrypted latest management key to the new onboard computer,
(iv) decrypting, by the new onboard computer, the encrypted latest management key using the new initially-delivered key, and
(v) storing, by the new onboard computer, the latest management key.

12. A non-transitory computer-readable storing medium storing a computer program causing a computer to execute:
   storing a plurality of initially-delivered keys in connection with a plurality of onboard computers installed in a vehicle and a new initially-delivered key in connection with a new onboard computer newly installed in the vehicle on an initially-delivered key storage;
   communicating with an onboard computer among the plurality of onboard computers installed in the vehicle;
   receiving, during the communicating, encrypted data from the onboard computer to verify the encrypted data with an initially-delivered key among the plurality of initially-delivered keys stored on the initially-delivered key storage; and
   updating a management key utilized in updating a key used for an encrypted communication between the plurality of each onboard computer via (i) through (v),
   (i) verifying whether the new initially-delivered key is stored in the new onboard computer,
   (ii) encrypting a latest management key using the new initially-delivered key,
   (iii) sending the encrypted latest management key to the new onboard computer,
   (iv) decrypting, by the new onboard computer, the encrypted latest management key using the new initially-delivered key, and
   (v) storing, by the new onboard computer, the latest management key.

13. A management method for managing a plurality of onboard computers installed in a vehicle, wherein data communication among the plurality of onboard computers is verified using a plurality of initially-delivered keys stored on an initially-delivered key storage, the management method comprising:
   detecting a new onboard computer newly installed in the vehicle;
   receiving a new initially-delivered key issued by a management server equipment;
   storing the new initially-delivered key on the initially-delivered key storage;
   verifying whether the new initially-delivered key is held by the new onboard computer; and
   updating a management key utilized in updating a key used for an encrypted communication between the plurality of each onboard computer via (i) through (v),
   (i) verifying whether the new initially-delivered key is stored in the new onboard computer,
   (ii) encrypting a latest management key using the new initially-delivered key,
   (iii) sending the encrypted latest management key to the new onboard computer,
   (iv) decrypting, by the new onboard computer, the encrypted latest management key using the new initially-delivered key, and
   (v) storing, by the new onboard computer, the latest management key.

* * * * *